Nov. 21, 1961 C. V. HINTON 3,009,641

VARIABLE VOLTAGE MULTIPLIER

Filed Oct. 29, 1956

INVENTOR.
CURTIS V. HINTON
BY
H. H. Losche
ATTORNEYS

United States Patent Office 3,009,641

Patented Nov. 21, 1961

3,009,641

VARIABLE VOLTAGE MULTIPLIER

Curtis V. Hinton, Cincinnati, Ohio, assignor to the United States of America as represented by the Secretary of the Navy Filed Oct. 29, 1956, Ser. No. 619,089

1 Claim. (Cl. 235—195)

Figures 1, 2:
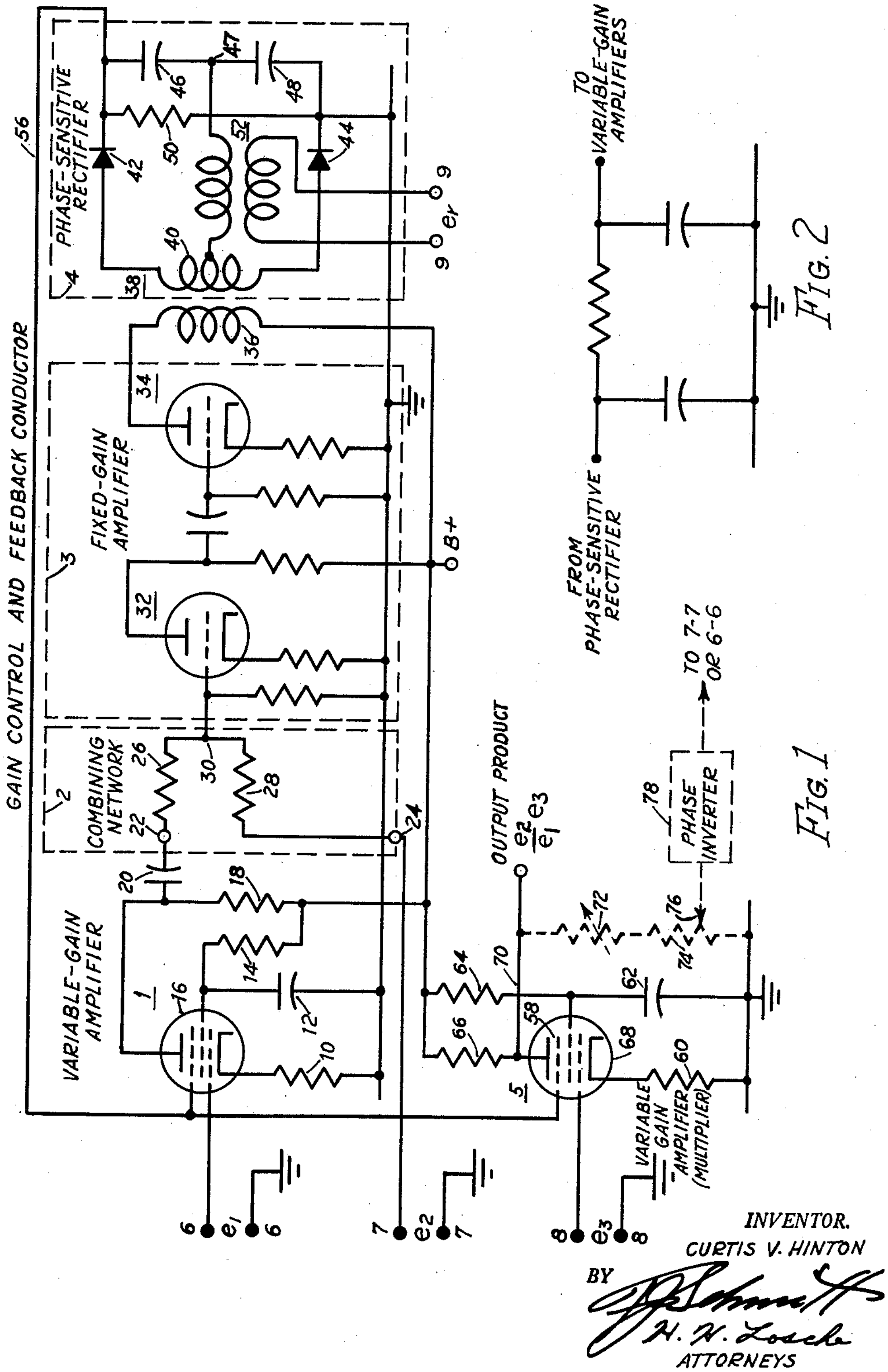

(Granted under Title 35, U.S. Code (1952), sec. 266)

The invention described herein may be manufactured and used by or for the Government of the United States of America for governmental purposes without the payment of any royalties thereon or therefor.

In accordance with this invention, a variable-voltage multiplier comprises apparatus for multiplying an electrical input signal (the multiplicand) by a unidirectional multiplier signal representative of the ratio of two variable-amplitude, in-phase, A.-C. signals. The multiplicand signal may be a variable or constant unidirectional or alternating voltage. In mathematical terms, the operation of the apparatus is such that its signal output, $E_o$, may be expressed, $$E_o = \frac{e_2}{e_1} e_3$$

where $e_1$ represents one of the variable-amplitude input signals, $e_2$ represents another variable-amplitude input signal in phase with $e_1$, and $e_3$ represents the constant or variable unidirectional or alternating signal to be multiplied.

With a minor structural modification, the invention also may be utilized as a constant-voltage source.

In general, the multiplication product is generated by first developing a unidirectional multiplier signal which varies in magnitude with the ratio of the two A.-C. in-phase input signals. Next, the multiplicand input signal is applied to the control element of a variable-gain amplifier and the unidirectional multiplier signal is applied to the gain-control element. As a result, the output of the variable-gain amplifier will be proportional to the unidirectional multiplier signal at least along linear portions of the amplifier output varsus gain-control voltage characteristic.

An embodiment of the invention includes a first channel wherein the unidirectional multiplier signal is generated from two variable-amplitude, in-phase, A.-C. signals, hereinafter referred to as "ratio-multiplier input signals," and a second channel wherein multiplication of the input signal by the unidirectional signal occurs. A variable-gain amplifier having control and gain-control elements is an important component of each channel.

The variable-gain amplifier of the second, or multiplying channel, referred to hereinafter as the "multiplying amplifier," is the component in which multiplication occurs. The multiplicand input signal is applied to its control element, and the unidirectional multiplying signal, generated in the first channel and representative of the ratio between the two multiplier input signals, is coupled to its gain-control element. The output of the amplifier, therefore, will be representative of the product of the multiplicand and multiplier signals.

The variable-gain amplifier of the first channel has control and gain-control elements and an output versus gain-control signal characteristic similar to that of the second-channel multiplying amplifier. One of the ratio-multiplier input signals is applied to the control element of the variable-gain amplifier to produce an inverted phase output. This output is then applied, together with the other input signal, to a combining network wherein the two are added algebraically. The resultant signal output of the combining network, if any, is amplified in a fixed-gain linear amplifier and then rectified in a phase-sensitive rectifier to produce a unidirectional output signal. This unidirectional output signal is representative of the amplitude difference between the two variable-amplitude A.-C. input signals from which it is derived. To render the unidirectional signal representative of the ratio of the two in-phase ratio-multiplier input signals, it is fed back to the gain-control element of the variable-gain amplifier with a polarity which will render the amplitude of the output of the variable-gain amplifier equal to that of the input signal to which it is added in the combining network. The same unidirectional signal required to produce this result is also utilized as the multiplier signal which, when applied to the gain-control element of the multiplying amplifier, will regulate its amplification to an extent sufficient to make its output representative of the product of the signals on its control and gain-control elements.

The invention also may be utilized to provide a source of voltage having constant amplitude notwithstanding changes in the magnitude of a load connected across the output of the multiplying amplifier. To produce this result, it is necessary merely to use a single, constant-amplitude, A.-C. voltage source for the multiplicand voltage, $e_3$, and for one of the ratio input voltages, $e_1$ or $e_2$. Such a voltage may be derived from a common supply source. The other ratio input voltage may be a portion of the voltage developed across the variable load coupled to the output of the multiplying amplifier. However, the phase of this voltage portion, or the phase of $e_3$, $e_1$, or $e_2$ must be inverted so that it will the same phase as that of the constant-amplitude ratio-multipler input voltage. Accordingly, when the variable load reduces the output voltage, the gain of the multiplying amplifier is increased by an amount sufficient to compensate for the tendency of the output voltage to drop. Conversely, tendencies of the variable load voltage to increase are compensated by a reduction in the gain of the multiplying amplifier.

It should be apparent that apparatus of the type described may fulfill other operating requirements. For example, the multiplier may function as an amplitude follower circuit wherein the amplitude of the output voltage of the multiplying amplifier is regulated to be proportional to the amplitude of one of the ratio voltages, $e_1$ or $e_2$ while the other is maintained at a constant amplitude. An explanation of the way in which this result is obtained is set forth below in the detailed description.

Accordingly, the objects of the subject invention are:

(1) To provide apparatus for multiplying one signal by the ratio of two other signals, (2) To provide apparatus which may be utilized as a source of constant-voltage for a variable load, (3) To provide apparatus which may be utilized to cause the first variable signal to follow the variations of a second controlling signal, (4) To provide apparatus for the uses set forth, which is wholly electronic.

The foregoing summary of the invention and statement of its objects are intended merely to facilitate the development of an understanding and appreciation of its principal features, not to restrict its scope. It is probable that additional objects and features of the invention will become apparent after reference to the following detailed description made in conjunction with the accompanying drawings wherein:

FIGURE 1 is a schematic diagram representing a specific embodiment of the subject invention, and FIGURE 2 represents a smoothing filter which may be used to advantage in conjunction with the aforesaid embodiment.

The subject invention, as illustrated in FIGURE 1, may comprise a first signal channel including a variable-gain amplifier 1, a combining network 2, a fixed-gain amplifier 3, and a phase-sensitive rectifier 4 coupled to generate a unidirectional multiplier signal; and a second signal channel consisting of variable-gain amplifier 5 wherein multiplication occurs. The circuitry required to modify the embodiment of FIGURE 1 to provide a constant amplitude voltage source is represented by dotted lines.

To generate the unidirectional multiplier signal, the first channel receives two variable-amplitude, in-phase, input signals, comprising the aforesaid ratio-multiplier input signals, $e_1$ and $e_2$, on input terminals 6—6 and 7—7, respectively.

In general, the unidirectional multiplier signal is developed from the ratio-multiplier signals by first inverting the phase of one and combining it algebraically with the other to produce a signal representative of the difference between their amplitudes. This differential signal is then converted into a unidirectional signal which may be fed back to the gain-control grid of the variable-gain amplifier 1 regulate its gain, such that the amplitude of ratio-multiplier signal $Xe_1$ is made equal to the amplitude of ratio-multiplier signal $e_2$. It should be apparent, of course, that a unidirectional signal which produces this result necessarily would be equal to or representative of the multiplier factor X by which the ratio $e_1/e_2$ must be multiplied to render it equal to unity.

The foregoing statement may be expressed mathematically as follows. Suppose $e_2$ is equal to $Xe_1$ where X is a variable multiplying factor. Accordingly, an apparatus which is to make the amplitude of $e_2$ equal to that of $Xe_1$ may multiply $e_1$ by X. In any event, the quantity representative of the multiplier X must be produced therein. Accordingly, $$X=\frac{e_2}{e_1}$$

the ratio of the ratio-multiplier input signals. When $e_1$ equals $e_2$, no differential signal is produced and X, of course, is equal to 1.

The foregoing mathematical analysis is predicated upon the fact that the signal at terminal 30 is the algebraic sum of the signals at terminals 22 and 24, respectively, and this sum must be maintained substantially at zero. Indeed, multiplication occurs only when the circuit of FIGURE 1 operates in accordance with the expression, $$e_2+(-x)e_1=\epsilon,\ |\epsilon|<<1$$

wherein $-x$ represents the multiplier function of the variable-gain amplifier 1. As $\epsilon$ approaches zero, the accuracy of the system approaches a maximum.

In FIGURE 1, the ratio-multiplier signal $e_1$, applied to terminals 6—6, passes to the control grid of variable-gain amplifier 1 wherein it is amplified and inverted in-phase. The variable-gain amplifier 1 may comprise a conventional five-element vacuum tube having a cathode resistor 10, a screen by-pass condenser 12, and screen load resistor 14. The suppressor grid of pentode 16 operates as a gain-control element. In a successful embodiment constructed by the applicant the variable-gain amplifier was a conventional 6AS6 pentode.

The output signal of the variable-gain amplifier developed across load resistor 18 is coupled via condenser 20 to input terminal 22, and ratio-multiplier signal $e_2$ is applied to input terminal 24, of combining network 2, where they are added algebraically. Inasmuch as the combining network 2 is formed of equal resistors 26 and 28 connected to form a voltage divider between input terminals 22 and 24, and the ratio-multiplier input signals, $e_1$ and $e_2$, are 180° out of phase, the A.-C. voltage, if any, at the network output terminal 30 will represent the amplitude difference between $Xe_1$ and $e_2$.

The difference signal is coupled to the fixed-gain linear amplifier 3 comprised of conventional resistance-capacitance coupled amplifying stages 32 and 34. Inasmuch as the structure and function of these two stages are entirely conventional, a detailed description thereof is unnecessary.

After amplification in the fixed-gain amplifier 3, the difference signal passes through the primary winding 36 of coupling transformer 38. The secondary winding 40 comprises the input element of the phase-sensitive rectifier 4. This rectifier is entirely conventional and may be comprised of apparatus such as that represented in FIGURE 1. The unidirectional potential output of the phase-sensitive rectifier is fed back through conductor 56 to the gain-control element 16 of variable-gain amplifier 1 and the gain-control element 58 of the multiplying amplifier 5.

Like amplifier 1, the multiplying amplifier 5 also is a conventional variable-gain voltage amplifier. In the embodiment represented in FIGURE 1, this amplifier comprises pentode tube 68, degenerative cathode biasing resistor 60, screen grid bypass condenser 62, screen potential dropping condenser 64, and plate load resistor 66. The multiplicand signal $e_3$ is coupled to the control grid of tube 68 via terminals 8—8, and the unidirectional multiplying signal is coupled to the suppressor grid 58.

In the embodiment constructed by the applicant the pentode tube 68 was a conventional 6AS6 pentode having a gain versus suppressor voltage characteristic substantially the same as that of the 6AS6 pentode used in variable-gain amplifier 1. Unless the aforesaid characteristics of the variable-gain amplifiers have substantially the same parameters, a resultant error will be present in the product output.

The signal representative of the multiplication product exists on the plate of multiplying amplifier 68 and, for example, may be tapped therefrom via output conductor 70.

A common source of D.-C. potential is coupled to the B+ terminal.

In the following description of the operation of the embodiment of FIGURE 1, the electron theory of electric current is adopted. Accordingly, it should be understood that moving electrons constitute the electric current and that the direction of flow is from negative to positive. In a space-discharge device, therefore, current passes from the electron emitting element to the collecting element.

In the operation of the illustrative embodiment the A.-C. ratio-multiplier input signals, $e_1$ and $e_2$, having the same phase but varying in amplitude, are applied to input terminals 6—6 and 7—7, respectively. The ratio-multiplier signal $e_1$ is inverted in phase in variable-gain amplifier 1, and is then coupled to the combining network 2 at terminal 22. The ratio-multiplier signal $e_2$ is coupled directly to terminal 24 of the combining network 2. As a result of inverting the phase of $e_1$, the input signals on input terminals 22 and 24 of the combining network 2 and 180° out of phase, and the output signal present on terminal 30 will represent their amplitude difference.

To simplify the explanation of the operation of the remainder of the circuit, assume first that the amplitude of the signal at terminal 22 exceeds that at terminal 24. When such is the case, the gain control and feedback signal on conductor 56 must become more negative in order to reduce the gain of the variable-gain amplifier 1, thereby decreasing the amplitude of the signal at terminal 22 until it cancels the signal at terminal 24 and the difference signal at terminal 30 approaches zero.

On the other hand, when the amplitude of the signal at terminal 24 exceeds that of the signal at terminal 22, the gain control and feedback signal on conductor 56 must become less negative in order to increase the gain of the variable-gain amplifier 1 and, as a result, raise the amplitude of the signal at terminal 22 until it cancels the signal at terminal 24, thereby reducing the difference signal at terminal 30 to zero.

It should be noticed that the phase of the difference signal at terminal 30 is determined by the relative magnitudes of the two signals at terminals 22 and 24, respectively. Hence, when the amplitude of the signal at terminal 22 exceeds that of the signal at terminal 24, the difference signal at terminal 30 has a first phase; conversely, when the amplitude of the signal at terminal 24 exceeds that at terminal 22, the difference signal at terminal 30 has a second phase 180° removed from the first phase. The significance of the 180°-phase relationship between difference signals for the two immediately preceding conditions will become apparent hereinafter.

After the difference signal increases to a usable amplitude in the fixed-gain linear amplifier 3, it passes through coupling transformer 38 to the phase-sensitive rectifier 4. In the phase-sensitive rectifier, the difference signal effectively is split in the secondary winding 40 of transformer 38 into two components mutually opposed in phase, one in the upper and another in the lower half of the winding. These components of the difference signal interact with the A.-C. reference signal $e_r$, coupled between the center tap of the secondary winding 40 and point 47, to produce resultant increases or decreases in the unidirectional potential on the upper plate of condenser 46.

For example, consider the operation of the phase-sensitive rectifier 4 when the difference signal has the aforesaid first phase, produced when the amplitude of the signal at terminal 22 exceeds the amplitude of the signal at terminal 24. To make the difference signal of terminal 30 approach zero, the gain of the variable-gain amplifier 1 must be reduced. The necessary reduction of gain will occur when the potential on the suppressor grid of pentode 16 is made more negative, decreased as the result of a concurrent increase in the negative potential on the upper plate of condenser 46. Accordingly, the phase of the reference signal, $e_r$, must be such that it combines with the difference signal component in the upper half of the secondary winding 40 to produce an increased flow of unidirectional current through diode 42 to cause a corresponding increase in the volume of electrons and, hence, negative charge on the upper plate of condenser 46. While the upper plate of condenser 46 is charging, the difference signal component in the lower half of secondary winding 40 also is combining with the reference signal $e_r$ to decrease the volume of electrons flowing through point 47 to the lower plate of condenser 46 and the upper plate of condenser 48.

It should be apparent, therefore, that the unidirectional potential on the upper plate of condenser 46 will be determined by the difference in potential existing across the plates of condenser 46. Moreover, the removal or supply of electrons at the upper plate of condenser 46 must exceed the corresponding supply or removal of electrons at the lower plate through point 47 for, if the change in the volume of electrons at both locations is equal and opposite, the potential on the upper plate of condenser 46 will remain unchanged. From this analysis, therefore, it should be obvious that the phase angle between the reference signal $e_r$ and the difference signal in secondary winding 40 should be other than an odd multiple of 90°. For maximum corrective action, the phase angle should be 0° or 180°.

If it should be assumed that the amplitude of the signal at terminal 24 of the combining network 2 exceeds that of the signal at terminal 22, the phase of the difference signal at terminal 30 and, consequently, that of the difference signal components of transformer secondary 40 are reversed, thereby resulting in the removal of a greater volume of electrons from the upper plate of condenser 46 than is removed at point 47. As a result, the unidirectional potential on the upper plate of condenser 46 becomes less negative and the gain of pentode 16 increases, thereby increasing the amplitude of the signal at terminal 22 until it approaches that of the signal at terminal 24.

The time constant of the integrating circuit comprised of resistor 50 and condensers 46 and 48 is such that a substantially constant potential is maintained on feedback conductor 56.

When the signals present at terminals 22 and 24, respectively, of the combining network are equal in amplitude, no difference signal exists on terminal 30 and, consequently, no difference signal components are induced in the upper and lower halves of secondary winding 40 by the primary 36. When such is the case, the potential level on the upper plate of condenser 46 is established solely by the reference signal $e_r$.

As a result of the rectifying and integrating operation of phase-sensitive rectifier 4, a unidirectional potential proportional to the difference in amplitude between ratio-multiplier input signals, $e_1$ and $e_2$, exists in the feedback path 56. Inasmuch as this unidirectional signal is supplied to suppressor grids 16 and 58 of the variable-gain amplifiers 1 and 5, respectively, their gains will be varied accordingly. Therefore, when the amplitude of ratio-multiplier input signal $e_1$ exceeds the amplitude of $e_2$, the signal on feedback path 56 will become proportionately more negative and, as a result, the gain of variable-gain amplifier 1 will be reduced sufficiently to make the signals entering the combining network 2 on terminals 22 and 24 approximately equal in amplitude. Inasmuch as the same potential change which reduces the gain of variable-gain amplifier 1 also is supplied to the suppressor grid 58 of variable-gain amplifier 5, the gain of the latter also will be reduced a corresponding amount. Its output, therefore, will be representative of the product $$\frac{e_2}{e_1}e_3$$

Some improvement in performance may be obtained by inserting a conventional pi-type filter, such as that represented in FIGURE 2, in the feedback path 56. Inasmuch as the theory of such filters is well known in the art, a discussion thereof is omitted.

To utilize the apparatus of FIGURE 1 as a source of constant voltage for a varying load, it is necessary merely to derive ratio-multiplier signal $e_1$ and multiplicand input signal $e_3$ from the same source, and to derive ratio-multiplier signal $e_2$ from the variable load itself. In FIGURE 1, the dotted lines represent one method of achieving the aforestated result. The variable load is represented symbolically by the variable resistor 72 connected between the output lead 70 and potentiometer 74. The lower end of potentiometer 74 is connected to a ground source of constant potential. The ratio-multiplier signal $e_2$ appears on the pickoff arm 76 of the potentiometer 74. The pickoff arm is connected through a phase inverter 78 to the input terminals 7—7. It should be understood, of course, that the variable load may be any resistive load.

The phase inverter 78 operates to make the phase of the ratio-multiplier input signal $e_2$ the same as that of ratio-multiplier input $e_1$. Accordingly, fluctuations in the amplitude of the signal on pickoff arm 76, attributable to variations in the power consumed by the variable load 72, will change the amplitude ratio of signals $e_1$ and $e_2$. As explained above, any change in this ratio produces a corresponding increase or decrease in the gain of multiplying amplifier 5. Furthermore, the direction of the resulting changes in gain is such that variations in the voltage across variable load 72 will be compensated.

Alternatively, as stated above, where the voltages $e_1$ and $e_3$ are derived from the same source, the phase inverter 78 may be inserted between the source and the input terminals 6—6, or between the voltage source and the input terminals 8—8.

It is unnecessary, of course, that voltages $e_1$ and $e_3$ be derived from the same source. It is necessary only that these two signals either be in-phase or 180° out of phase, depending upon the location of phase inverter 78.

The subject invention also may be utilized as an amplitude follower. The apparatus represented in FIGURE 1 normally will function as an amplitude follower if the amplitudes of the multiplicand input signal $e_3$ and one of the ratio-multiplier input signals, $e_1$ or $e_2$, are maintained constant and the other ratio-multiplier signal is changed in amplitude in accordance with any desired pattern of fluctuation. From the above description of the operation of the invention, it should be apparent that the output of multiplying amplifier 5 will vary in amplitude to an extent proportional to the changes in amplitude of the variable ratio-multiplier input signals.

The details of the subject invention illustrated in the accompanying drawings and set forth in the foregoing description are intended merely to facilitate the practice of the invention by persons skilled in the art. The scope of the invention is represented in the following claim.

I claim:

Apparatus for multiplying an alternating-current signal $e_3$ constituting a multiplicand quantity by a multiplier quantity representative of the ratio of the respective amplitudes of two alternating-current, in-phase, variable-amplitude ratio-multiplier input signals, $e_1$ and $e_2$, to produce an output quantity representative of the product, $e_2e_3/e_1$, comprising: means including $e_1$ input means and $e_2$ input means for generating a signal representative of the amplitude ratio, $e_2/e_1$; means including $e_3$ input means coupled to the said ratio-representative signal generating means for multiplying the said multiplier quantity, $e_2/e_1$, by the said multiplicand quantity, $e_3$, to produce an output quantity representative of the product $e_2e_3/e_1$ for a load, said means for multiplying including means for deriving a portion of said load and mean for inverting the phase of said portion and applying it to one of said input means $e_1$ and $e_2$ to regulate the magnitude of said multiplier quantity $e_2/e_1$, whereby fluctuations in said load produce changes in said portion to stabilize said output quantity at a constant amplitude.

References Cited in the file of this patent

UNITED STATES PATENTS 2,845,528 Brook ---------------- July 29, 1958
2,855,148 Schroeder et al. ---------- Oct. 7, 1958

FOREIGN PATENTS 572,731 Great Britain ---------- Oct. 22, 1945

OTHER REFERENCES

Electronic Analog Computers (Korn & Korn), 1952, pp. 220 and 221.

Proc. of the IRE (McCool), October 1953, pp. 1470–1471.

Servo Mechanism Practice (Ahrendt), 1954, page 72.